United States Patent
Seita

(10) Patent No.: US 8,041,208 B2
(45) Date of Patent: Oct. 18, 2011

(54) IMAGING APPARATUS HAVING FOREIGN SUBSTANCE REMOVAL MEMBER WHICH OVERLAPS SHUTTER BLADE MOVING LOCUS IN OPTICAL AXIS DIRECTION

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 12/323,342

(22) Filed: Nov. 25, 2008

(65) Prior Publication Data

US 2009/0169196 A1 Jul. 2, 2009

(30) Foreign Application Priority Data

Dec. 27, 2007 (JP) ................................. 2007-337730

(51) Int. Cl.
- *G03B 17/48* (2006.01)
- *G03B 17/00* (2006.01)
- *H04N 5/225* (2006.01)
- *B60R 1/06* (2006.01)

(52) U.S. Cl. ......... 396/429; 396/480; 396/529; 359/507

(58) Field of Classification Search .................. 396/429
See application file for complete search history.

(56) References Cited

U.S. PATENT DOCUMENTS

| | | | |
|---|---|---|---|
| 7,492,408 B2 * | 2/2009 | Ito | 348/335 |
| 7,763,340 B2 * | 7/2010 | Sakai et al. | 428/141 |
| 2006/0087584 A1 | 4/2006 | Noto | 348/374 |
| 2007/0195185 A1 * | 8/2007 | Onuki | 348/333.02 |
| 2007/0285551 A1 * | 12/2007 | Noto | 348/335 |
| 2010/0157138 A1 * | 6/2010 | Noto | 348/362 |

FOREIGN PATENT DOCUMENTS

| | | | |
|---|---|---|---|
| JP | 2001-298640 | | 10/2001 |
| JP | 2005-292404 | | 10/2005 |
| JP | 2006-119461 | | 5/2006 |
| JP | 2007-052076 | | 3/2007 |
| JP | 2008-180815 | * | 8/2008 |

OTHER PUBLICATIONS

JP 2008-180815, Machine English Translation, 20 pages, Aug. 7, 2008.*

* cited by examiner

*Primary Examiner* — W. B. Perkey
*Assistant Examiner* — Bret Adams
(74) *Attorney, Agent, or Firm* — Canon USA Inc IP Division

(57) ABSTRACT

An imaging apparatus includes a foreign substance removal member configured to move along a surface of an optical member to remove foreign substances, a shutter blade configured to open and close an photographic optical path, the shutter blade being disposed closer to an object side than the optical member, and a cover plate configured to restrict an operation range of the shutter blade toward the optical member side, wherein the cover plate has an opening larger than the photographic optical path, and an area other than the photographic optical path of the opening includes a standby position for the foreign substance removal member, and at least a part of the foreign substance removal member is positioned inside the opening.

3 Claims, 17 Drawing Sheets

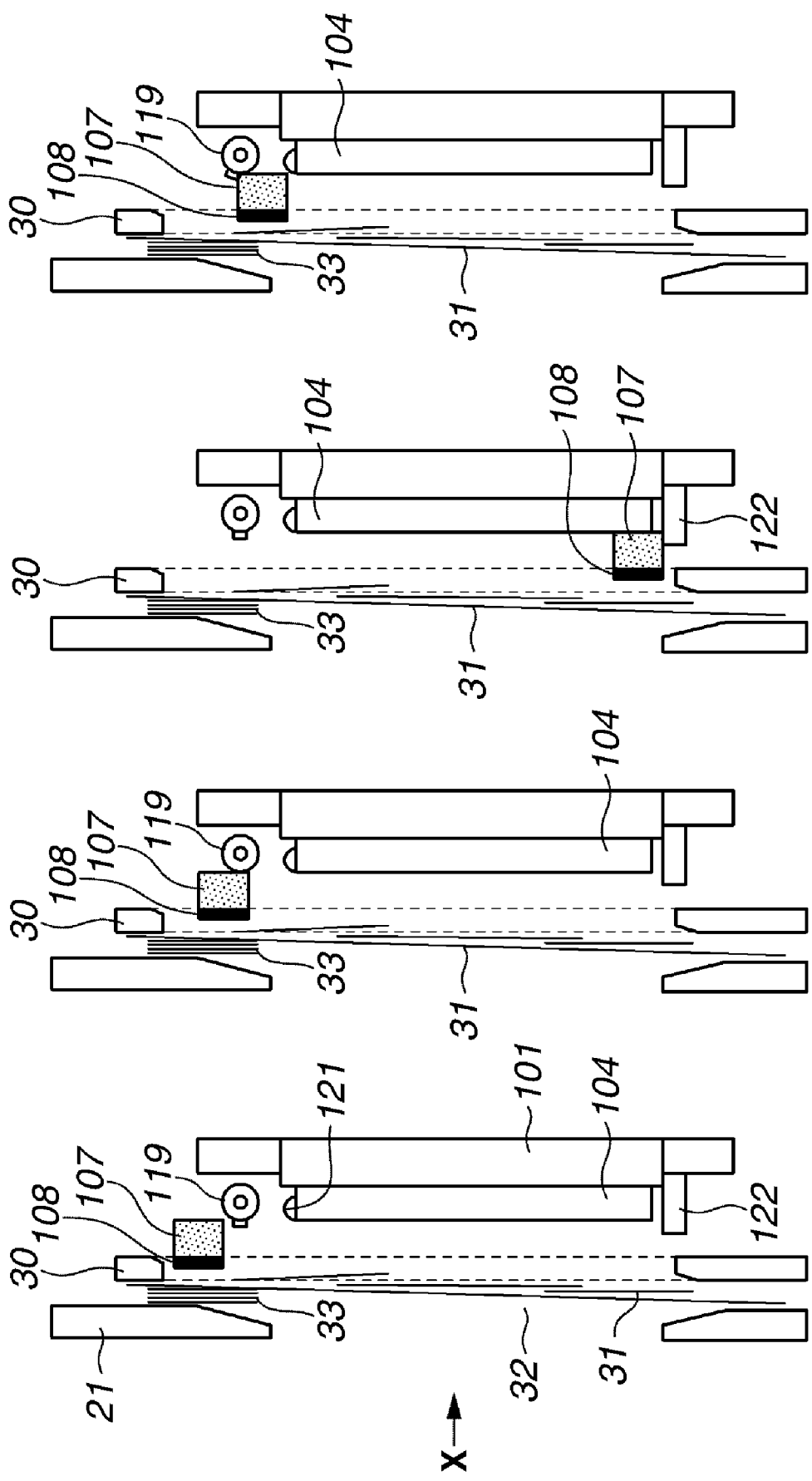

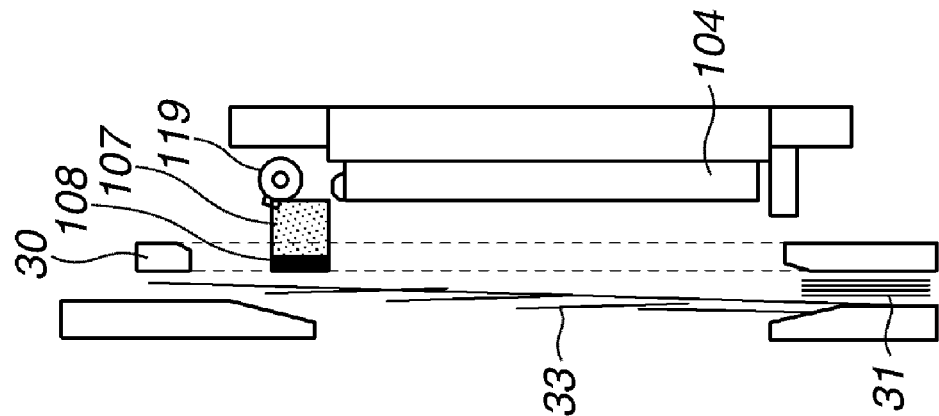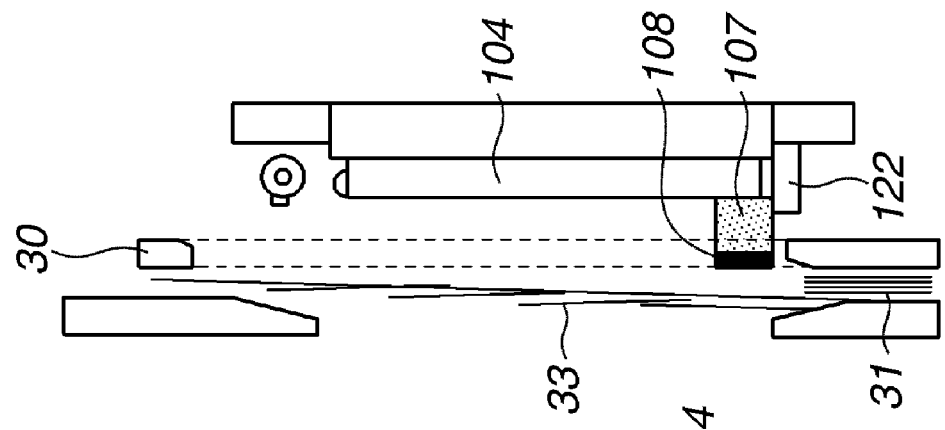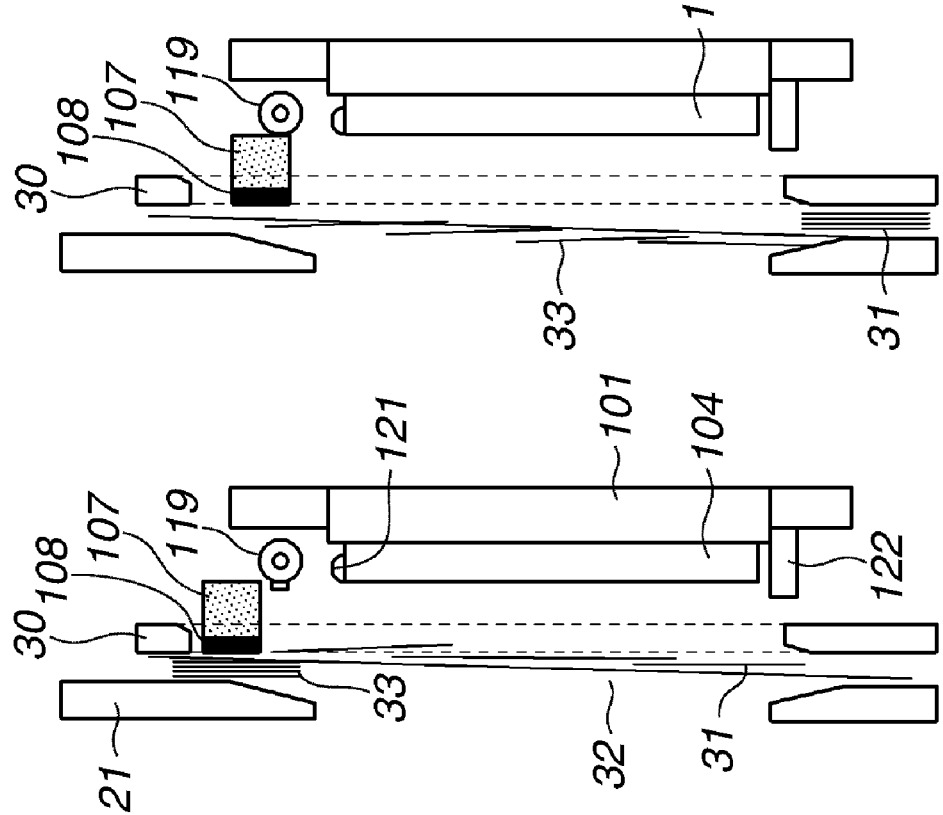

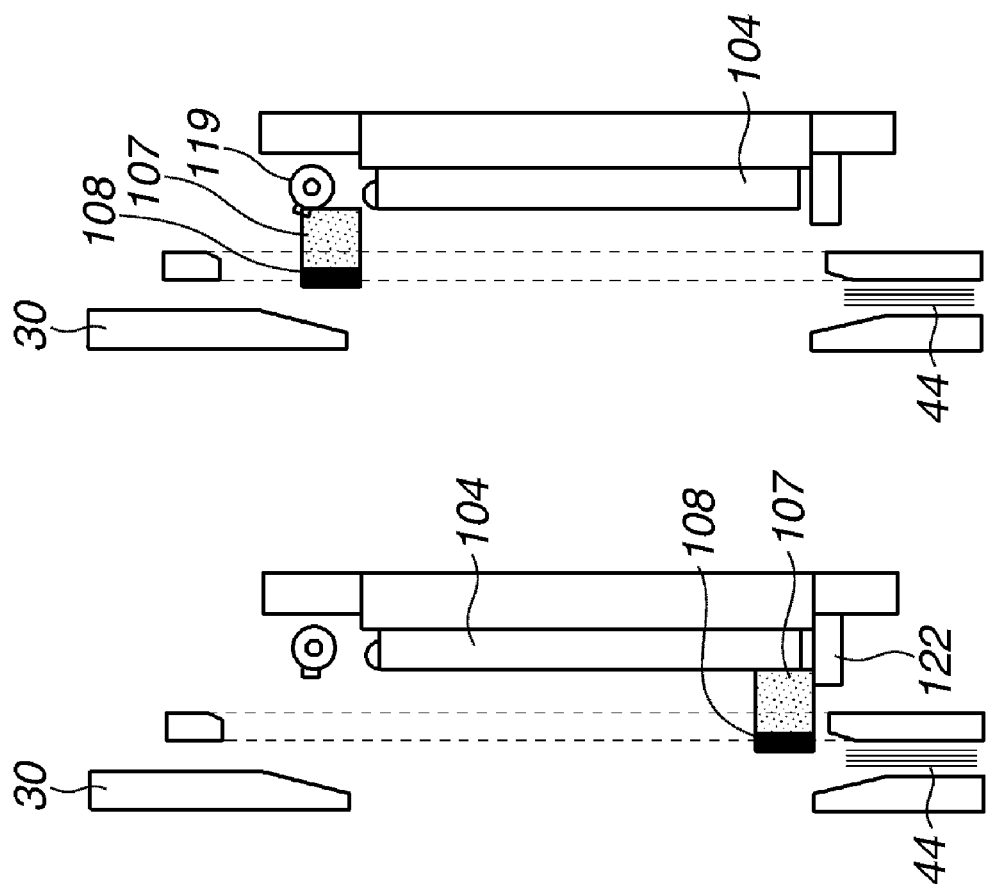

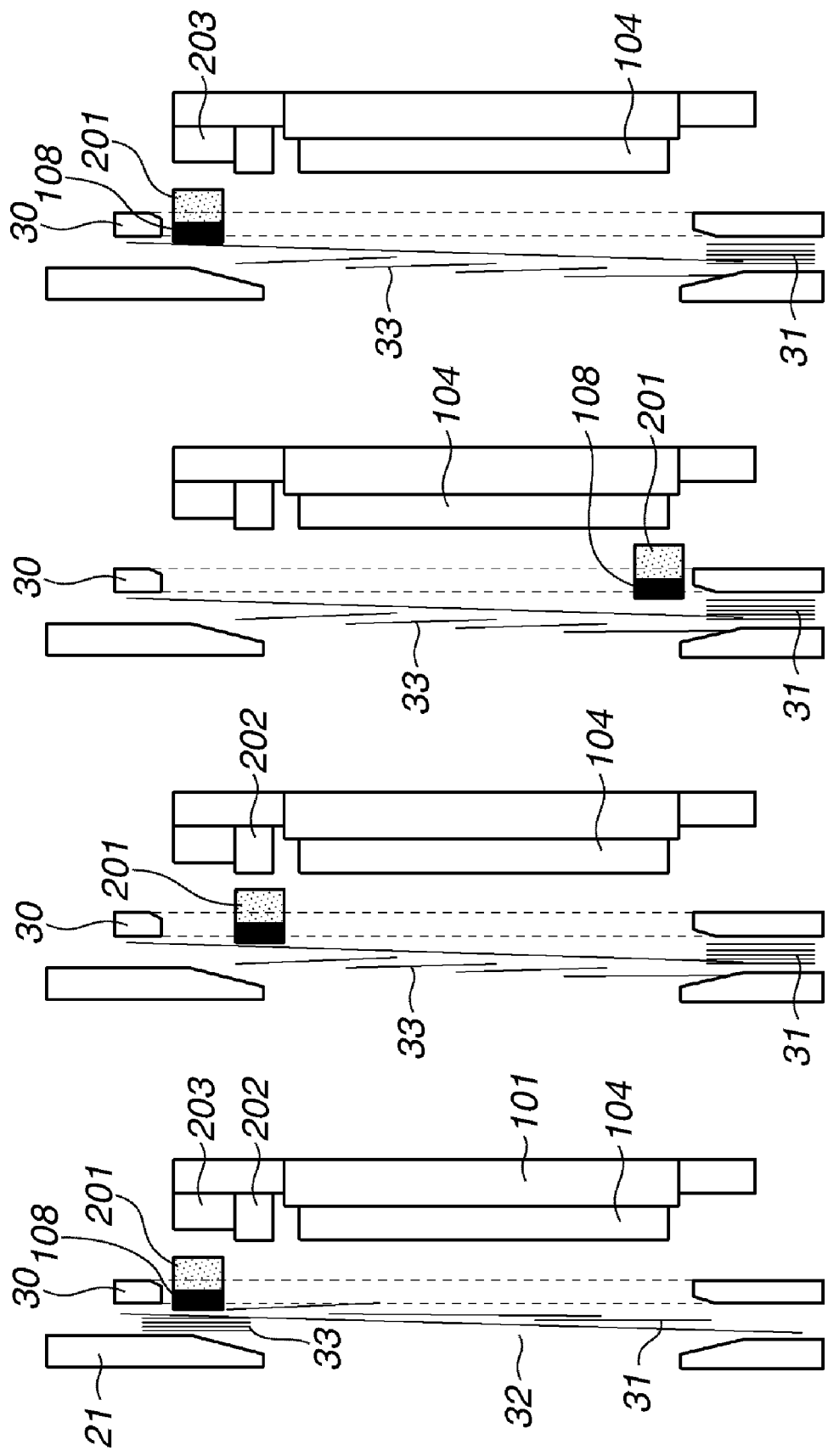

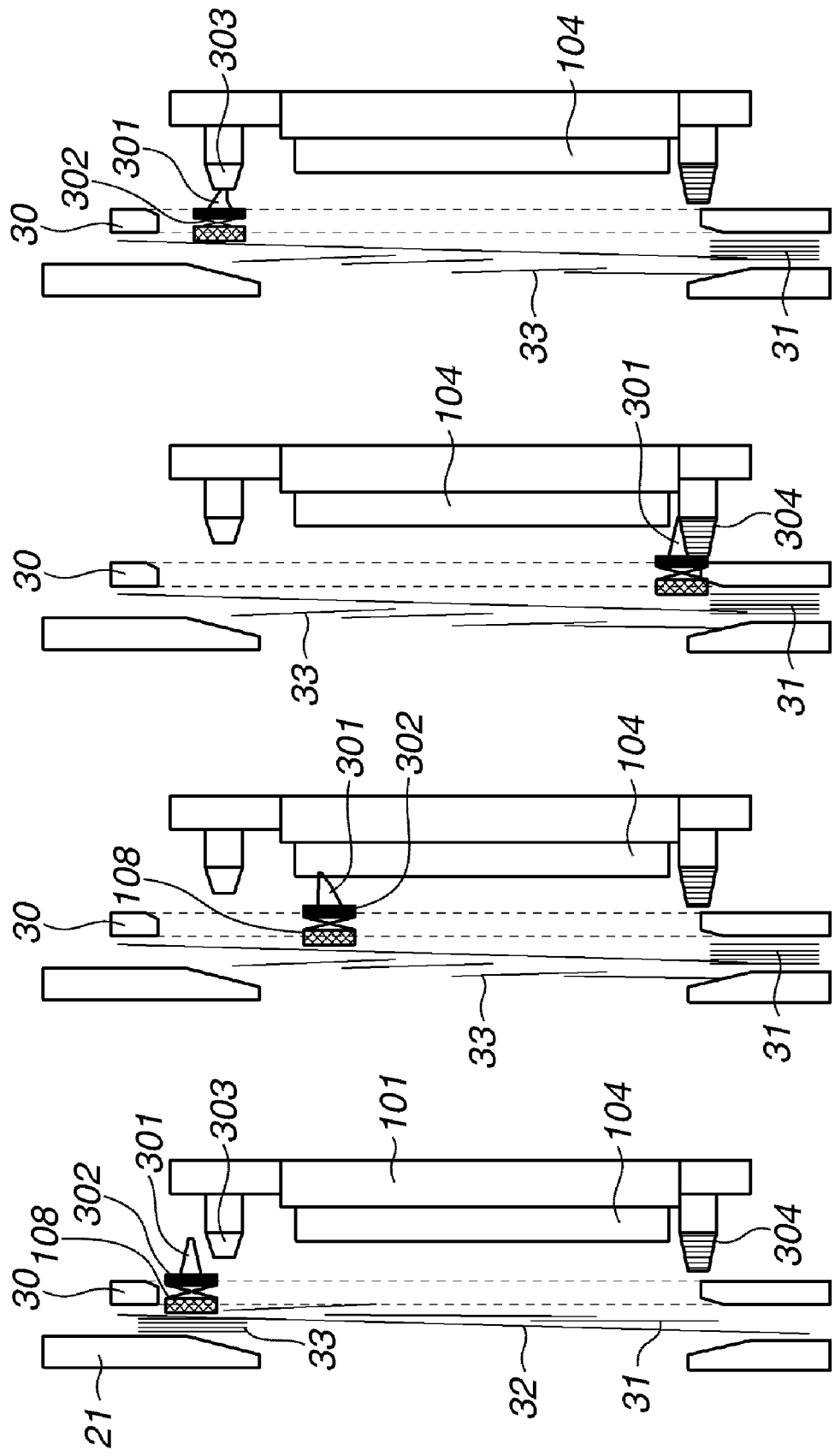

IMAGING APPARATUS HAVING FOREIGN SUBSTANCE REMOVAL MEMBER WHICH OVERLAPS SHUTTER BLADE MOVING LOCUS IN OPTICAL AXIS DIRECTION

BACKGROUND OF THE INVENTION

1. Field of the Invention

The present invention relates to an imaging apparatus, such as a digital camera, including a foreign substance removal mechanism to remove foreign substances adhering to the surface of an optical member.

2. Description of the Related Art

In recent years, an imaging apparatus, such as a digital camera, using an image sensor has been widely used. However, particularly, in a single-lens reflex type digital camera, a problem has arisen in which foreign substances may adhere to the surface of an optical member, such as an image sensor or a filter, thereby causing a captured image to contain an image of the foreign substances. The foreign substances are mostly dust, which enters from the outside to an imaging aperture when a lens is detached, and abrasion powder generated by operation of mechanical elements, such as a quick return mirror or a focal-plane shutter.

The foreign substance may be removed by spraying air on the surface of an optical member. However, it is difficult to completely remove the foreign substance. In such a case, work to wipe the surface of the optical member is required to remove the foreign substances. However, wiping the surface of the optical member by hand may cause surface irregularity or scratches on the surface of the optical member.

Accordingly, some apparatuses with simple mechanism have been proposed to remove foreign substances adhering to the surface of the optical member. A method of providing an optical member with vibration and dropping foreign substances adhering to the surface has been proposed and has actually been mounted on a camera. However, if the vibration is provided unnecessarily too much, it may cause such a failure that the vibrating optical member is broken. Thus, the amount of the vibration to be provided thereto has a limit. Accordingly, there has been a problem that a vibration type foreign substance removal apparatus cannot completely remove foreign substances having large adhesion.

Some other methods for removing foreign substances adhering to the surface of an optical member have been proposed. Japanese Patent Application Laid-Open No. 2005-292404 discusses a method for exposing the surface of an image sensor to the outside, allowing a foreign substance attracting member to enter the inside of a photographic optical path from the outside, and bringing the attracting member into contact with the surface of the image sensor with a suitable contact pressure to remove foreign substances.

In Japanese Patent Application Laid-Open No. 2001-298640, a method is discussed in which a wiper member is incorporated in a camera. The wiper member is brought into contact with the surface of an image sensor and scans thereon by motor drive.

In Japanese Patent Application Laid-Open No. 2006-119461, a method is discussed in which an electrically charged member scans the surface of an image sensor, without contact therewith, to remove foreign substances therefrom using electrostatic force.

An apparatus discussed in Japanese Patent Application Laid-Open No. 2005-292404 is an accessory apparatus which is attachable to an outside of a camera to be operated by a user. When cleaning is required, a lens must be removed and the accessory apparatus must be attached, so that the operation is intricate. Accordingly, there may be a problem for a user to miss a photo opportunity.

In an apparatus discussed in Japanese Patent Application Laid-Open No. 2001-298640, a wiper member or the like is incorporated inside a camera, so that foreign substance removal operation can be simply performed at any timing. However, since the wiper member is disposed between a shutter blade and an image sensor, this may cause restrictions on the arrangement of elements. In particular, the traveling surface of the shutter blade is away from an imaging surface, thus reducing shutter efficiency. Accordingly, there has been a problem that moving body stop capability is inferior at a high shutter speed.

Further, when shutter efficiency needs to be kept as high as possible, it is necessary for a wiper member to be thinned. Accordingly, there has been a problem that the wiper member is inferior in strength and location accuracy. In particular, when the wiper member is limited to a thin material, a spring constant is increased even if it is an elastic body. Therefore, it is difficult for the wiper member to give a constant pressure on the surface of an image sensor. The pressure significantly varies due to a slight accuracy error of the wiper member. Thus, this may result in such a state that foreign substances cannot be removed or it may cause scratches on the surface of the image sensor.

An apparatus discussed in Japanese Patent Application Laid-Open No. 2006-119461 uses an electric charge unit also as a shutter blade, so that restrictions on the arrangement of elements and deterioration in shutter efficiency can be reduced to be minimum. However, an increase in inertia moment of the shutter blade causes problems that a high shutter speed cannot be achieved and the shutter blade is inferior in durability. Further, when an electric charge member is separately provided and scans between the shutter device and the image sensor, similar to the apparatus discussed in Japanese Patent Application Laid-Open No. 2001-298640, this causes restrictions on the arrangement of elements. In addition, the shutter blade traveling surface is away from the imaging surface, so that the shutter efficiency is decreased and the moving body stopping capability is inferior at a high shutter speed.

SUMMARY OF THE INVENTION

The present invention is directed to an imaging apparatus, such as a digital camera, including a foreign substance removal mechanism to remove foreign substances adhering to the surface of an optical member.

According to an aspect of the present invention, an imaging apparatus includes a foreign substance removal member configured to move along a surface of an optical member to remove foreign substances, a shutter blade configured to open and close a photographic optical path, the shutter blade being disposed closer to an object side than the optical member, and a cover plate configured to restrict an operation range of the shutter blade toward the optical member side, wherein the cover plate has an opening larger than the photographic optical path, an area other than the photographic optical path of the opening includes a standby position for the foreign substance removal member, and at least a part of the foreign substance removal member is positioned inside the opening.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5D are diagrams illustrating a configuration of a foreign substance removal mechanism according to a first exemplary embodiment of the present invention.

FIGS. 9A to 9D are diagrams illustrating a configuration of a foreign substance removal mechanism according to a second exemplary embodiment of the present invention.

FIGS. 13A to 13D are diagrams illustrating a configuration of a foreign substance removal mechanism according to a fourth exemplary embodiment of the present invention.

FIGS. 14A to 14D are diagrams illustrating a configuration of a foreign substance removal mechanism according to a fifth exemplary embodiment of the present invention.

FIGS. 15A to 15D are diagrams illustrating a configuration of a foreign substance removal mechanism according to a sixth exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1A:
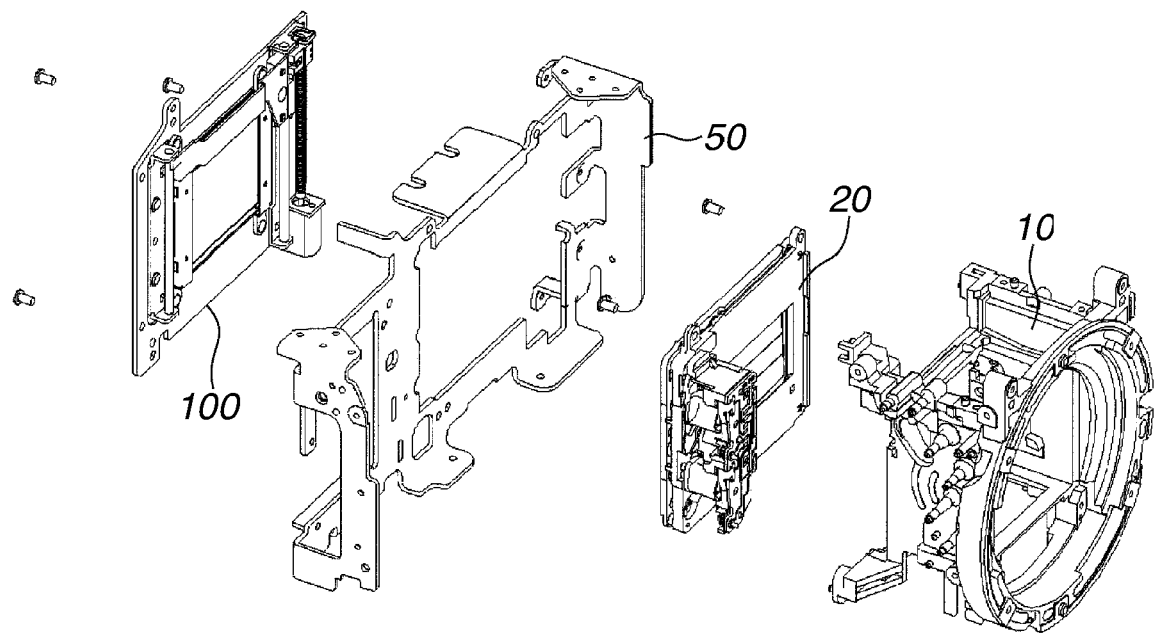
FIGS. 1A and 1B are perspective views illustrating an internal structure of a digital single-lens reflex camera.
Figure 1B:
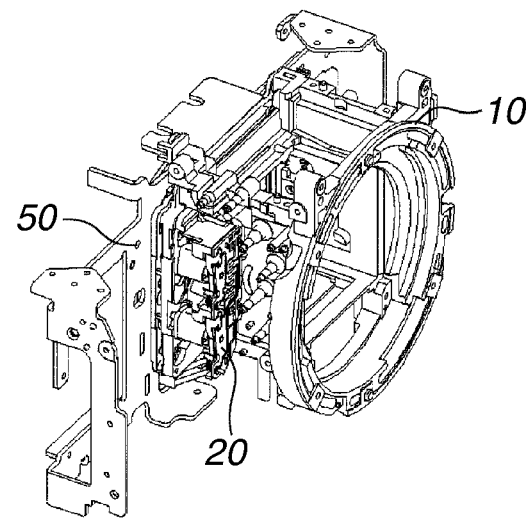

FIG. 1A is an exploded perspective view illustrating an internal structure of a digital single-lens reflex camera. In a camera main body (not shown), a mirror box 10 having a mount unit configured to attach a lens unit thereto, a focal-plane shutter-type shutter unit 20, a main frame 50, and an image sensor unit 100 configured to contain a foreign substance removal mechanism are disposed from an object side. FIG. 1B is a perspective view illustrating a state in which these configuration elements are assembled.

Figure 2A:
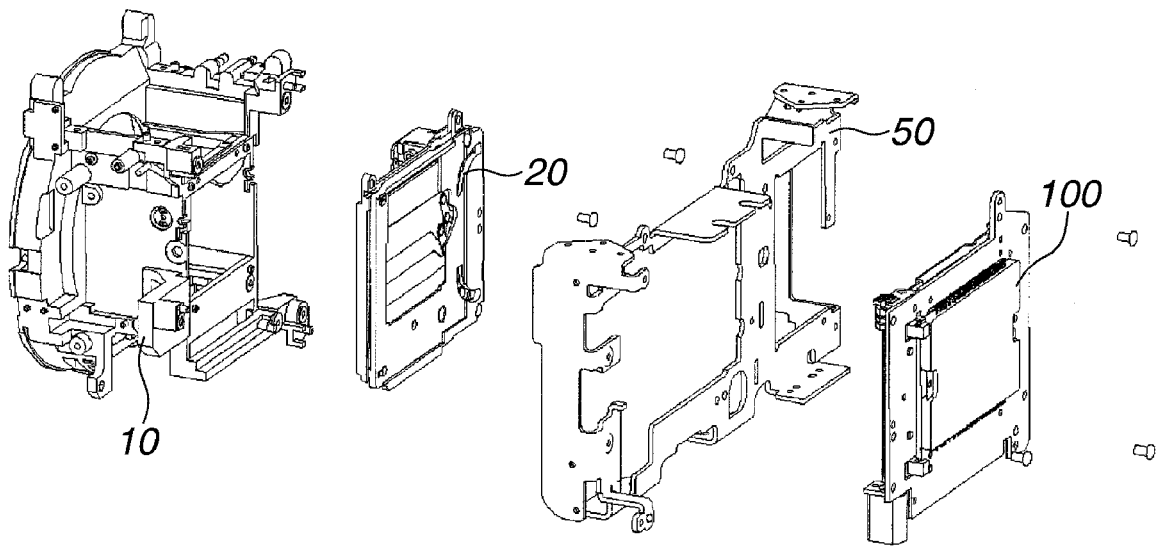
FIGS. 2A and 2B are perspective views illustrating an internal structure of a digital single-lens reflex camera.
Figure 2B:
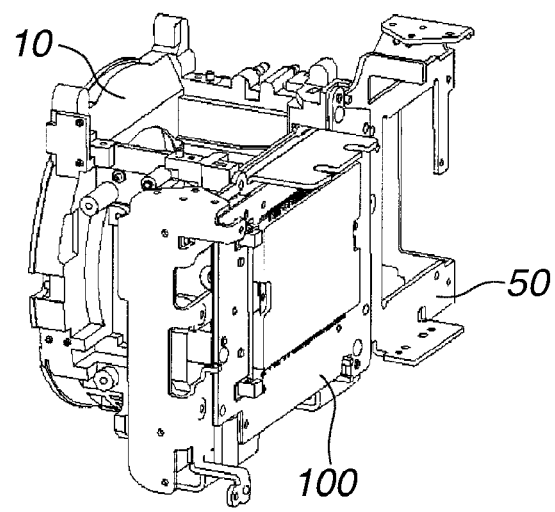

FIGS. 2A and 2B are perspective views where FIGS. 1A and 1B are viewed from an image sensor side, respectively.

Figure 3:
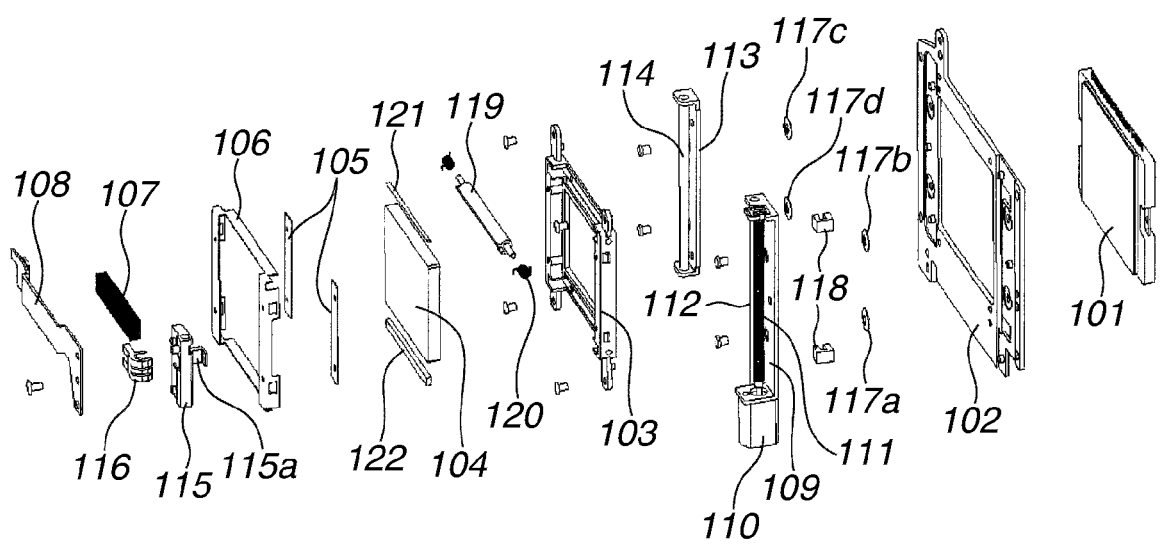
FIG. 3 is an exploded perspective view illustrating an image sensor unit.
Figure 4A:
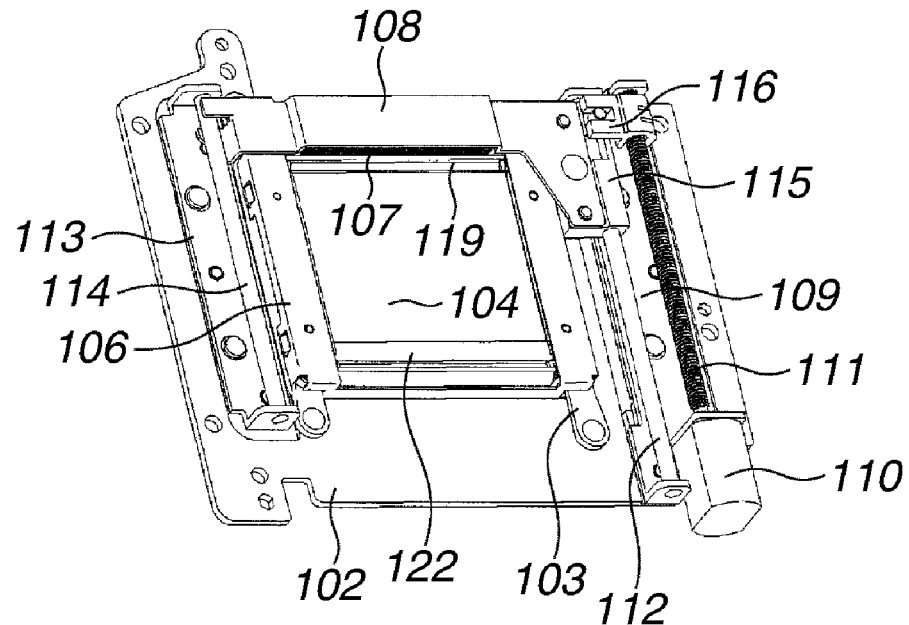
FIGS. 4A and 4B are perspective views illustrating a state that an image sensor unit is assembled.
Figure 4B:
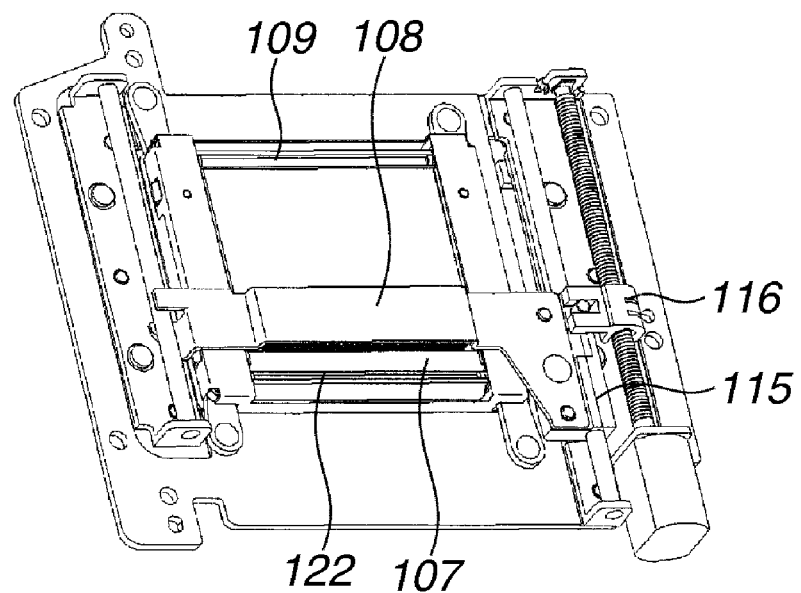

Referring to FIGS. 3, 4A, and 4B, a configuration and operation of the image sensor unit 100 will be described. FIG. 3 is an exploded perspective view illustrating an image sensor unit 100. FIGS. 4A and 4B are perspective views illustrating a state that the image sensor unit 100 is assembled. FIG. 4A illustrates a state that a foreign substance removal member (a support plate 108 and a flocked member 107) is retracted. FIG. 4B illustrates a state that the foreign substance removal member is moved to the lower end of a low-pass filter (LPF) 104.

An image sensor 101 is attached to the back side of a base plate 102. Other elements, which will be described below, are assembled to the front side of the base plate 102, which is directed to an object side.

On the front side of the base plate 102, a motor angle 109 is disposed on one of narrow sides of the image sensor 101. The motor angle 109 extends in the direction parallel to the narrow side of the image sensor 101. A drive motor 110, a lead screw 111 secured on a rotation output axis of the drive motor 110, and a guide bar 112 for guiding the movement of the foreign substance removal member are assembled on the motor angle 109.

Further, on the front side of the base plate 102, a guide angle 113 is disposed on the other narrow side of the image sensor 101. That is, the guide angle 113 is disposed opposite the motor angle 109 across the image sensor 101. The guide angle 113 extends in the direction parallel to the narrow side of the image sensor 101. The guide bar 114 is assembled on the guide angle 113.

In front of the image sensor 101, the LPF 104 fitted in an LPF frame 103 is disposed. The LPF 104 is an optical member that cuts an unnecessary frequency component to suppress generation of false color and moiré. After an anti-reflection mask (picture frame mask) 105 is positioned on both left and right sides of the LPF 104, an LPF fixing frame 106 is fixed to the LPF frame 103 to secure the LPF 104.

Thus, a drive unit (e.g., motor angle 109) and a guide unit (e.g., guide angle 113) are disposed in either side of the LPF 104, respectively. The drive unit (e.g., motor angle 109) and a guide unit (e.g., guide angle 113) reciprocally move the foreign substance removal member (support plate 108 and flocked member 107) to remove foreign substances adhering to the surface of the LPF 104.

Specifically, one end of the support plate 108 is fixed to a drive guide 115 with screws. The drive guide 115 is movable along the guide bar 112. The guide bar 112 is secured to the motor angle 109 through the drive guide 115. Further, a drive rack 116 is secured to the drive guide 115 and connected directly to the lead screw 111. The drive rack 116 has the same the screw thread pitch as that of the lead screw 111.

Further, a plane plate portion and an L-shaped bending portion are adjacently provided on the other end of the support plate 108 to engage in the guide bar 114 while interposing the guide bar 114.

A torque of the drive motor 110 is transmitted from the lead screw 111 to the drive rack 116 to move the drive guide 115 along the guide bar 112, thereby reciprocally moving the foreign substance removal member.

In the foreign substance removal member, a portion which is recessed in a direction away from the side of the LPF 104 is formed in the central portion of the support plate 108. Herein, a bending portion subjected to bending processing is formed such that the central portion of the support plate 108 is bent one step, and the flocked member 107 is bonded and secured thereto. Since the bending portion is provided on the support plate 108 to fix the flocked member 107, a flocked sheet, a brush, or the like with long fibers can be bonded and secured. This configuration allows the foreign substance removal member to easily adjust a contact pressure to the surface of the LPF 104 during the foreign substance removal operation. That is, owing to the long fibers, elasticity can be decreased, pressure fluctuation can be smaller even if a contact state is slightly changed, and variation in foreign substance removal capability can be smaller even if an interval error occurs between the flocked member 107 and the surface of the LPF 104 due to variation in the shape of elements. Further, since the fibers are deformed to be in contact with the surface of the LPF 104, this allows the fibers to increase a contact area and to enhance the foreign substance removal capability. Even if foreign substances are adhesive material or a liquid, they can also be removed easily.

In this way, the bending portion is protruded to the side of the shutter unit 20 to the extent that the bending portion is formed on the support plate 108. However, as described below, the bending portion is configured so as not to interfere with the shutter unit 20.

Note that the support plate 108 is fixed to the drive guide 115 with screws. However, by removing these screws to rotate and erect the support plate 108 around the guide bar 114, replacement of the flocked member 107 can be easily made.

Of the end faces of the LPF 104, a LPF guide 121 is attached on an upper end face that is positioned in a scan direction side of the foreign substance removal member, and a foreign substance capture unit 122 is attached on a lower end face thereof.

The LPF guide 121 is provided on a retracted position side of the foreign substance removal member to prevent the flocked member 107 from being shaved when the flocked member 107 is brought into contact with the upper end face of the LPF 104. The LPF guide 121 is secured on the same face as the surface of the LPF 104. A contact portion with the flocked member 107 is made of a material, such as a resin, a rubber, or the like, which is softer than the flocked member 107, and made into a round shape, thereby relieving pressure and friction of contact.

The foreign substance capture unit 122 is a adhesive member to capture foreign substances dropping from or adhering to the flocked member 107 when the foreign substance removal member moves to the vicinity of the lower face of the LPF 104.

Further, the foreign substance capture unit 122 includes a rotational removal unit 119 configured to clean the flocked member 107 in the process in which the foreign substance removal member moves from a retracted position to the surface of the LPF 104. The rotational removal unit 119 is rotatably supported to the LFP fixing frame 106 with an axis and has a spring 120 on both of the left and right sides.

When the foreign substance removal operation is started and the foreign substance removal member moves from a retracted position onto the surface of the LPF 104, the flocked member 107 is brought into contact with the rotational removal unit 119. However, in this direction, since the rotational removal unit 119 contacts the wall portion of the LPF fixing frame 106, it cannot rotate. Accordingly, the rotational removal unit 119 exists as a fixed member in the process of movement of the foreign substance removal member, thereby brushing off foreign substances adhering to the flocked member 107 upward relative to the LPF 104.

On the other hand, when the flocked member 107 retracts from the surface of the LPF 104 to a retracted position, the flocked member 107 is brought into contact with the rotational removal unit 119. In this direction, the rotational removal unit 119 is rotatable. Thus, the flocked member 107 rotates the rotational removal unit 119 against the elasticity of the spring 120. That is, the foreign substance removal member moves to a retracted position without brushing off a lot of foreign substances adhering to the flocked member 107, thereby preventing the foreign substance from adhering to the surface of the LPF 104 again.

Incidentally, when the flocked member 107 moves while the flocked member 107 is in contact with the surface of the LPF 104, if the contact state of the flocked member 107 is not suitable, such problems arises that the foreign substances are not removed sufficiently at a certain position, or if the pressure applied is too high, that the surface of the LPF 104 is scratched by the flocked member 107. Therefore, the flocked member 107 is configured to be adjustable in the scanning height with respect to the surface of the LPF 104. Specifically, when the motor angle 109 and the guide angle 113 are secured, a disk spring 117 is intervened between the flocked member 107 and the base plate 102. Disk springs 117a and 117b, which are used to adjust the height and gradient of the motor angle 109, and disk springs 117c and 117d, which are used to adjust the height and gradient of the guide angle 113, are coaxially disposed with screws that are used to secure the respective angles. This allows the screwed amount of each screw to be adjusted such that the contact state with the LPF 104 is kept constant in the scan region of the foreign substance removal member.

Two photo-interrupters (PI) 118 are bonded and secured on the back surface of the motor angle 109. A relation is established in which a PI shield unit 115a disposed on the drive guide 115 is inserted into the PI 118, so that detection is performed whether the foreign substance removal operation is completed.

Next, referring to FIGS. 5A to 5D, the foreign substance removal operation will be described. Before the foreign substance removal operation is started (FIG. 5A), the foreign substance removal member (support plate 108 and flocked member 107) is present in a retracted position. When the foreign substance removal operation is started (FIG. 5B), the foreign substance removal member moves downward from the retracted position and the flocked member 107 is brought into contact with the rotational removal unit 119. In this direction, since the rotation of the rotational removal unit 119 is restricted, foreign substances adhering to the flocked member 107 are brushed off upward relative to the LPF 104. Note that when the flocked member 107 passes through the rotational removal unit 119, the rotational removal unit 119 has effects for not only brushing off foreign substances from the flocked member 107 but also for preventing the fibers from being deformed.

The foreign substance removal member moves further downward gradually to contact the LPF guide 121 provided on the upper end face of the LPF 104, and then moves on the surface of the LPF 104. The flocked member 107 moves while the flocked member 107 is in contact with the surface of the LPF 104, so that foreign substances adhering to the surface of the LPF 104 are removed. When the foreign substance removal member reaches the lower end of the LPF 104 (FIG. 5C), the flocked member 107 is brought into contact with the foreign substance capture unit 122, and the foreign substances adhering to the flocked member 107 are captured by the foreign substance capture unit 122. Herein, since the foreign substance capture unit 122 is an adhesive member, the foreign substances adhering to the flocked member 107 are adhered to the foreign substance capture unit 122.

Thereafter, a motor-energizing direction is reversed, thereby moving the foreign substance removal member upward and bringing the flocked member 107 into contact with the rotational removal unit 119 (FIG. 5D). In this direction, since the rotation of the rotational removal unit 119 is permitted, the flocked member 107 passes over the rotational removal unit 119 by slight contact force while rotating the rotational removal unit 119, and then returns to the retracted position.

Figure 6:
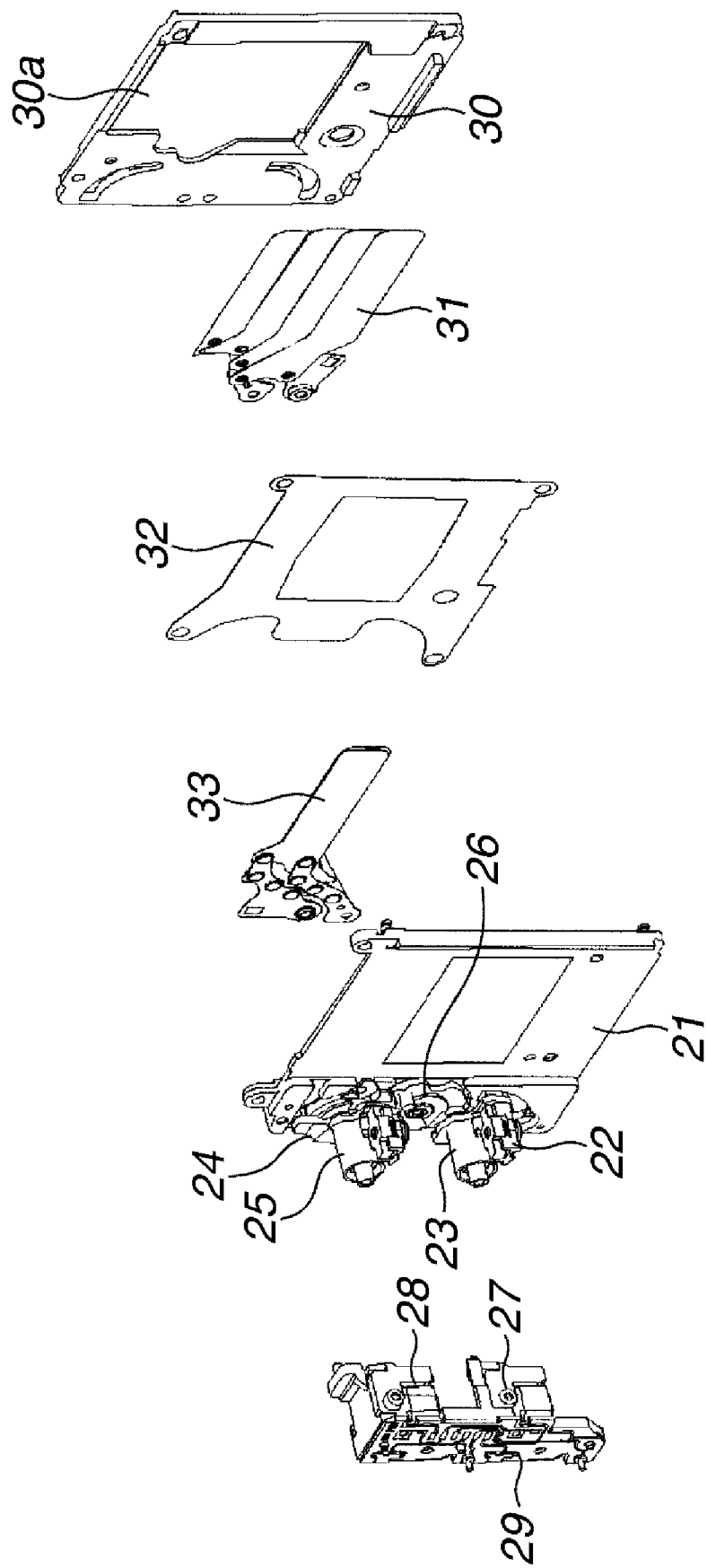
FIG. 6 is an exploded perspective view illustrating a shutter unit.
Figure 7A:
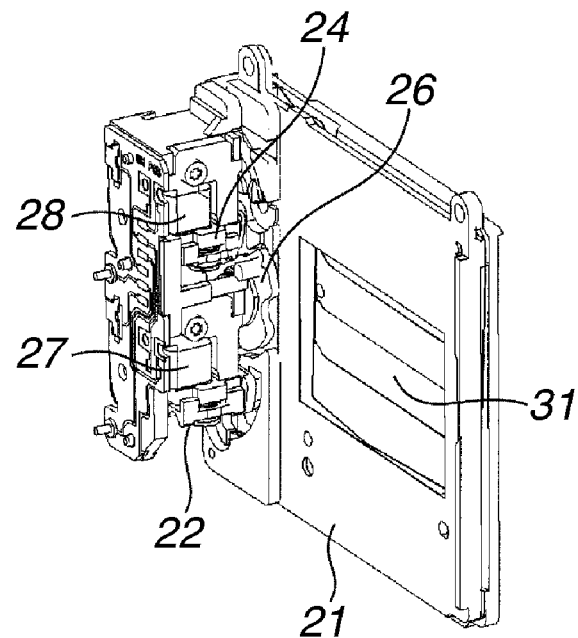
FIGS. 7A and 7B are perspective views illustrating a state that a shutter unit is assembled.
Figure 7B:
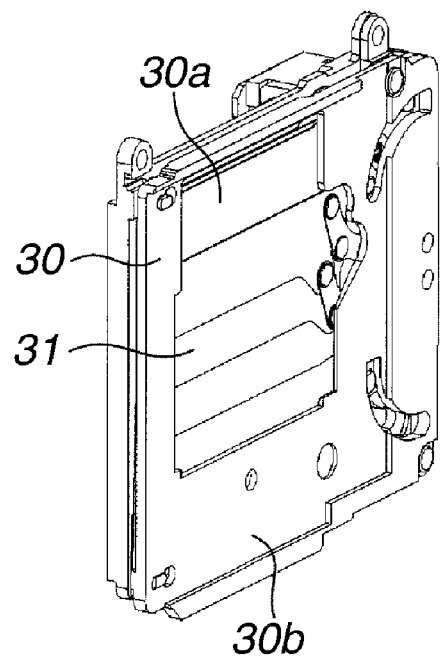

Referring to FIGS. 6, 7A, and 7B, a configuration and operation of the shutter unit 20 will be described. FIG. 6 is an exploded perspective view illustrating the shutter unit 20. FIGS. 7A and 7B are perspective views illustrating a state that the shutter unit 20 is assembled. FIG. 7A illustrates a state that the shutter unit 20 is viewed from the object side. FIG. 7B illustrates a state that the shutter unit 20 is viewed from the imaging plane side. Note that the shutter unit 20 is disposed closer to the object side (mount side) than the LPF 104 in a photographic optical path.

The shutter unit 20 includes two sets of shutter blades, including a first blade group (first curtain) 31 and a second blade group (second curtain) 33. The first curtain 31 shields (closes) a photographic aperture before an image is captured and is retracted from the photographic optical path in response to a photographing start signal. Note that the first curtain 31 is retracted from the photographic optical path downward. The second curtain 33 is retracted from the photographic optical path before image capture is started. The second curtain 33 travels and shields the photographic aperture after a predetermined time from when the first curtain 31 has traveled in response to the photographing start signal.

These two sets including the first and second curtains 31 and 33 are disposed between the shutter plate 21 and a cover plate 30. The first curtain 31 is disposed on the side of the cover plate 30. The second curtain 33 is disposed on the side of the shutter plate 21. A traveling space is partitioned by an intermediate plate 32 so that the first curtain 31 and the second curtain 33 do not interfere with each other. The photographic aperture (opening for the photographic optical path) is formed in approximately a central position of each of the shutter plate 21, the intermediate plate 32, and the cover plate 30.

The shutter plate 21 is provided with a shutter drive unit. Specifically, the shutter drive unit includes a first drive lever 22 for driving the first curtain 31, a first drive spring 23 serving as a drive source, a second drive lever 24 for driving the second curtain 33, a second drive spring 25 serving as a drive source, and a set lever 26. The set lever 26 rotates the first drive lever 22 and the second drive lever 24 to charge the drive springs 23 and 25, respectively, thereby setting them in a state before the start of image capture. Above the shutter drive unit, as a control unit configured to control the shutter drive unit, an electromagnet 27 for the first curtain 31 and an electromagnet 28 for the second curtain 33, including a yoke and a coil, and a wiring board 29 for energizing the coil are installed.

The cover plate 30 functions as a presser plate which restricts an operation range of the first curtain 31 to the side of the LPF 104, on which an opening portion 30a, which extends above the photographic aperture, is formed. The opening portion 30a serves as the retracted position of the foreign substance removal member. The opening portion 30a accommodates the bending portion of the support plate 108 when the foreign substance removal member is located in the retracted position. Further, as illustrated in FIG. 7B, on the imaging plane side of the cover plate 30, the surrounding area of the photographic aperture and the opening portion 30a is configured to be a thin portion 30b. The foreign substance removal member (except the bending portion of the support plate 108) moves in a space formed with the thin portion 30b. Note that the retracted space for the foreign substance removal member can be widened by further extending the opening portion 30a upward to separate the top of the cover plate 30 (the top of the cover plate 30 is completely open).

Next, the shutter operation will be described. Each of the first drive lever 22 and second drive lever 24 includes an iron portion. Before image capture is started, a yoke is in contact with the iron portion. When the coil of each of the electromagnets 27 and 28 for the first and second curtains 31 and 33 is energized in response to a photographing start signal, the yoke and the iron portion attract each other, and the first curtain 31 and the second curtain 33 are held in a set state even after the set lever 26 is retracted.

After retraction of a reflecting mirror (not shown), autofocus control and resetting of the image sensor 101 are completed to be ready for image capture. When energizing to the coil for the first curtain 31 is terminated, the first curtain 31 travels with driving force of the first drive spring 23. Then, after a predetermined time, when energizing to the coil for the second curtain 33 is terminated, the second curtain 33 travels with driving force of the second drive spring 25, so that an exposure operation is completed. The set lever 26 is set by a charge lever (not shown), and each of the first curtain 31 and the second curtain 33 is set in a state before the start of image capture. Thus, a series of operations is completed.

Figure 17A:
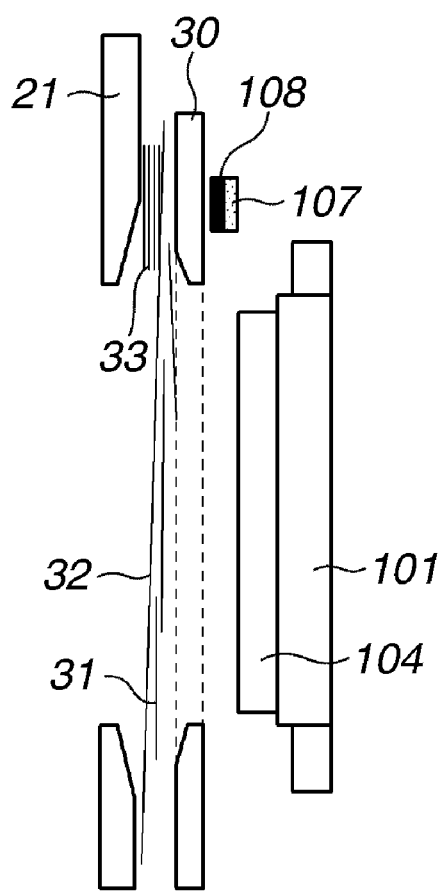
FIGS. 17A and 17B are diagrams illustrating a configuration of a conventional foreign substance removal mechanism.
Figure 17B:
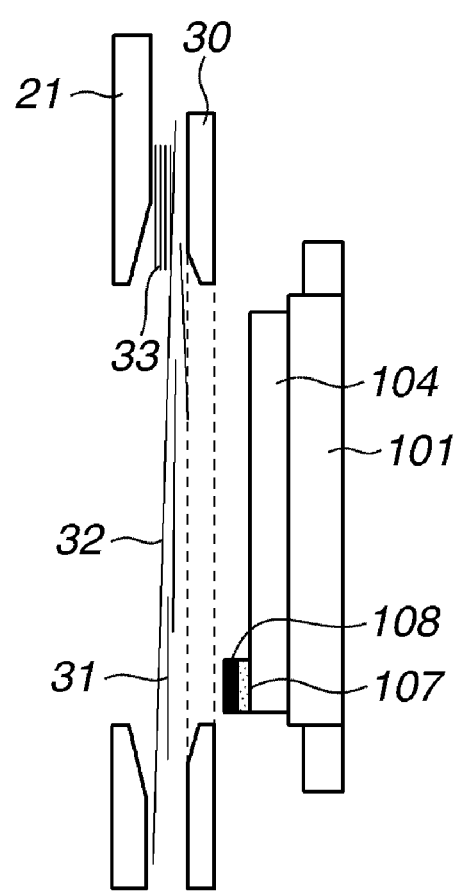

Now, a positional relation between a cover plate and a foreign substance removal member in a conventional foreign substance removal mechanism is compared with that in the present exemplary embodiment. FIGS. 17A and 17B are diagrams illustrating a configuration of a conventional foreign substance removal mechanism. Note that in order to make a comparison easy, the same reference numerals are appended to those that correspond to components described in the present exemplary embodiments. The shutter plate 21, the second curtain 33, the intermediate plate 32, the first curtain 31, the cover plate 30, the foreign substance removal member (support plate 108 and flocked member 107), the LPF 104, and the image sensor 101 are disposed from the object side.

FIG. 17A illustrates a state that the foreign substance removal member is retracted. The foreign substance removal member is retracted on the back face of the cover plate 30. FIG. 17B illustrates a state in which the foreign substance removal operation is in execution. The foreign substance removal member reaches the lower end of the LPF 104. In the conventional foreign substance removal mechanism, since the foreign substance removal member is moved through the gap between the cover plate 30 and the LPF 104, restriction caused by the gap size on the size of the flocked member 107 is imposed and the length of fibers of the flocked member 107 cannot sufficiently be secured. Due to short fibers, the rigidity thereof increases and may scratch the surface of the LPF 104. Further, this makes the constant contact state in the whole scan area difficult and foreign substances may be left unclean. It is not easy to secure the gap between the cover plate 30 and the LPF 104 by making the cover plate 30 and the LPF 104 thin. Thus, this may affect a shutter performance and an optical performance.

On the other hand, as illustrated in FIGS. 5A to 5D, also in the present exemplary embodiment, the shutter plate 21, the second curtain 33, the intermediate plate 32, the first curtain 31, the cover plate 30, the foreign substance removal member (support plate 108 and flocked member 107), the LPF 104, and the image sensor 101 are disposed from the object side.

However, as illustrated in FIG. 5A, with the foreign substance removal member retracted, the bending portion of the support plate 108 of the foreign substance removal member is accommodated in the opening portion 30a of the cover plate 30 and a part of the foreign substance removal member is housed in the thickness of the cover plate 30. In the present exemplary embodiment, the depth of the bending portion of the support plate 108 is within a depth in which it is not protruded over the face on the side of the first curtain 31 of the cover plate 30. Besides, since the retracted position of the foreign substance removal member is present above the cover plate 30 and on the opposite side to the retracted direction (downward direction) of the first curtain 31, the foreign substance removal member does not interfere with the operation of the first curtain 31. Further, since the second curtain 33 is disposed on the object side ahead of the intermediate plate 32, the foreign substance removal member also does not interfere with the operation of the second curtain 33 and the shutter operation can be performed without any trouble. This configuration allows a space for the foreign substance removal member to be wider than the conventional space and the length of fibers of the flocked member 107 to be longer. Note that in the retracted position of the foreign substance removal member, since the flocked member 107 is not brought into contact with other members, the fibers are not deformed.

Further, during the above-described foreign substance removal operation, the shutter operation is inhibited. A user is informed that the foreign substance removal operation is in execution with a display monitor. During the foreign substance removal operation, the photographic aperture is covered with the first curtain 31 of the shutter unit 20 and kept intact. Thus, intrusion of foreign substances from the outside is prevented.

Figure 8:
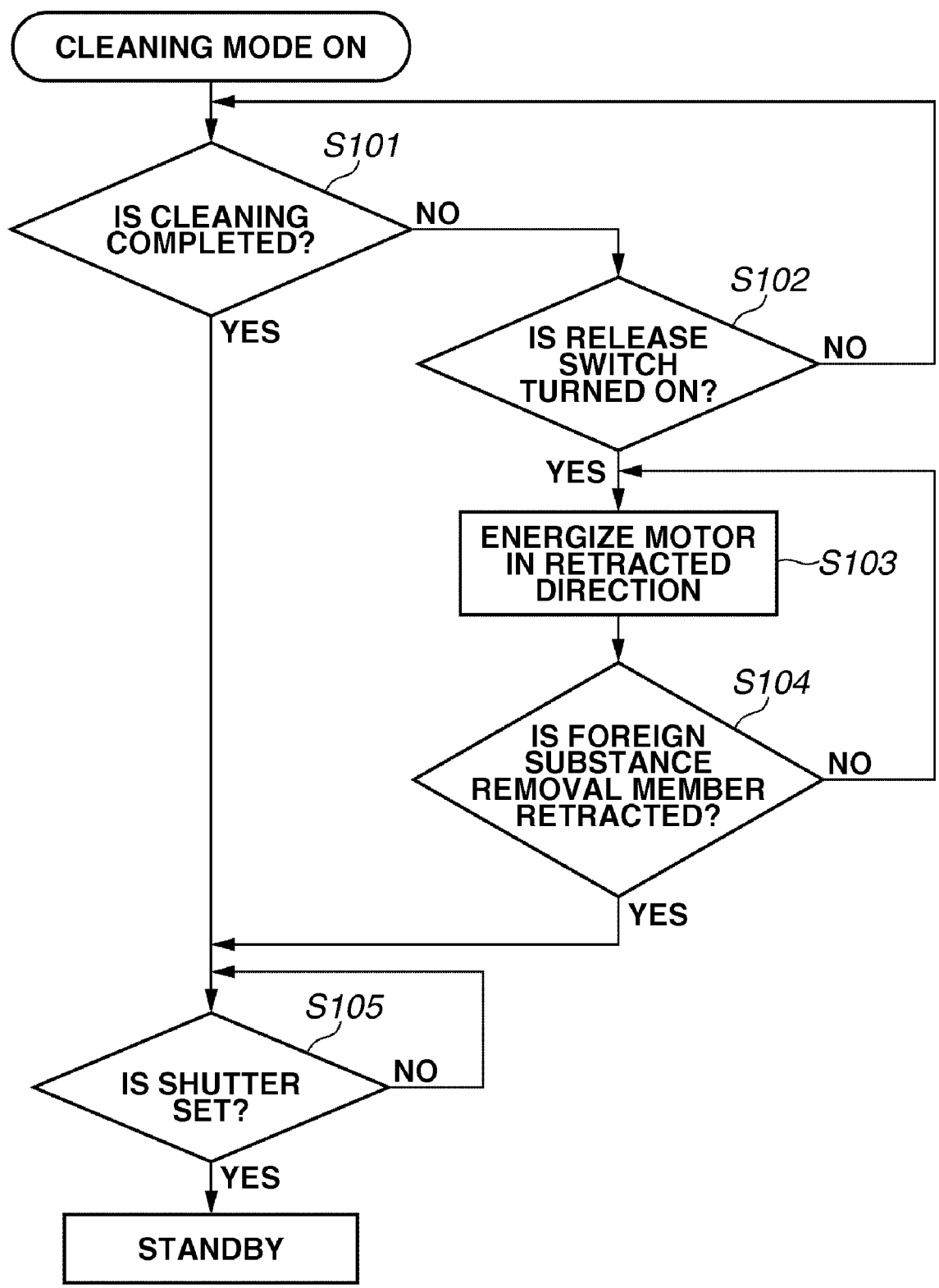
FIG. 8 is a flowchart illustrating an operation sequence when an image capture is instructed during foreign substance removal operation according to a first exemplary embodiment.

FIG. 8 illustrates an operation sequence when image capture is instructed during the foreign substance removal operation (cleaning operation). In step S101, the camera determines whether the foreign substance removal operation is completed according to a PI signal generated by the PI 118 and the PI shield unit 115a during the foreign substance removal operation. When a release button is pressed when the foreign substance removal operation is not completed (NO in step S101 and YES in step S102), then in step S103, in order to forcibly terminate the foreign substance removal operation, the camera energizes the motor in a retracted direction to retract the foreign substance removal member in the retracted position. After confirming that the foreign substance removal member is retracted (YES in step S104), then in step S105, the camera sets the shutter in a state in which an image can be captured. At this time, if a voltage to the motor is increased to retreat the foreign substance removal member at a speed higher than the normal condition, it is possible to prevent missing of a photo opportunity.

Note that in the present exemplary embodiment, foreign substances adhering to the surface of the LPF 104 as an optical member are removed. However, it may be configured to remove foreign substances adhering to other filters or the surface of the image sensor 101 (surface of the cover glass).

Further, other than the shutter configuration in the present exemplary embodiment, there are various types of focal-plane shutters. Thus, the shutter configuration is not limited thereto. In short, it can be configured to provide the opening portion 30a on the opposite side to the retracted direction of the shutter blade traveling on the side closer to the LPF 104, which can be utilized as the retracted position of the foreign substance removal member. Accordingly, the present exemplary embodiment is not limited to the arrangement and the traveling direction of the first and second curtains. The present exemplary embodiment can also be applied to a normally open type shutter, which opens the photographic aperture in a state before image capture is started to allow monitor display of an object image. Furthermore, the present exemplary embodiment can be applied to a type of shutter that has only one set of shutter blades, executes exposure control by a shutter function of an image sensor itself, and shields the photographic aperture to block unnecessary light when exposure is completed.

As described above, the cover plate 30 and a part of the foreign substance removal member are positioned on the same plane perpendicular to an optical axis X (refer to FIG. 5A), so that the foreign substance removal mechanism can be made compact and can be mounted in the camera without decreasing a shutter performance and a foreign substance removal capability.

Second Exemplary Embodiment

Referring to FIGS. 9A to 9D and 10, a second exemplary embodiment of the present invention will be described. Hereinafter, description will center on a point different from the first exemplary embodiment. Description of the same configuration and operation is not repeated. The second exemplary embodiment is different from the above-described first exemplary embodiment in the shape of the bending portion of the support plate 108 of the foreign substance removal member, the shape of the flocked member 107, the foreign substance removal operation, and the shutter operation sequence.

In the foreign substance removal member, the bending portion is formed so as to lower by one step in a direction away from the side of the LPF 104 in the central portion of the support plate 108. The depth of the bending portion is made deeper than that of the first exemplary embodiment. AS a result, as illustrated in FIGS. 9A to 9D, the bending portion of the support plate 108 is protruded over the surface of the cover plate 30 in the first curtain 31 side. In this way, deepening the bending portion allows the length of fibers of the flocked member 107 to be further increased, adjustment of a contact state to the LPF 104 to be further facilitated, a foreign substance removal performance to be improved, and a scratch on the LPF 104 to be prevented.

In the above-described first exemplary embodiment, moving loci of the first curtain 31 and the foreign substance removal member are not present on the same plane perpendicular to the optical axis. On the other hand, in the present exemplary embodiment, since the bending portion of the support plate 108 is protruded over the surface of the cover plate 30 on the side of the first curtain 31, moving loci of the first curtain 31 and the foreign substance removal member are at least partially overlapped. That is, the cover plate 30 and at least a part of the foreign substance removal member are present on the same plane perpendicular to the optical axis.

Figure 10:
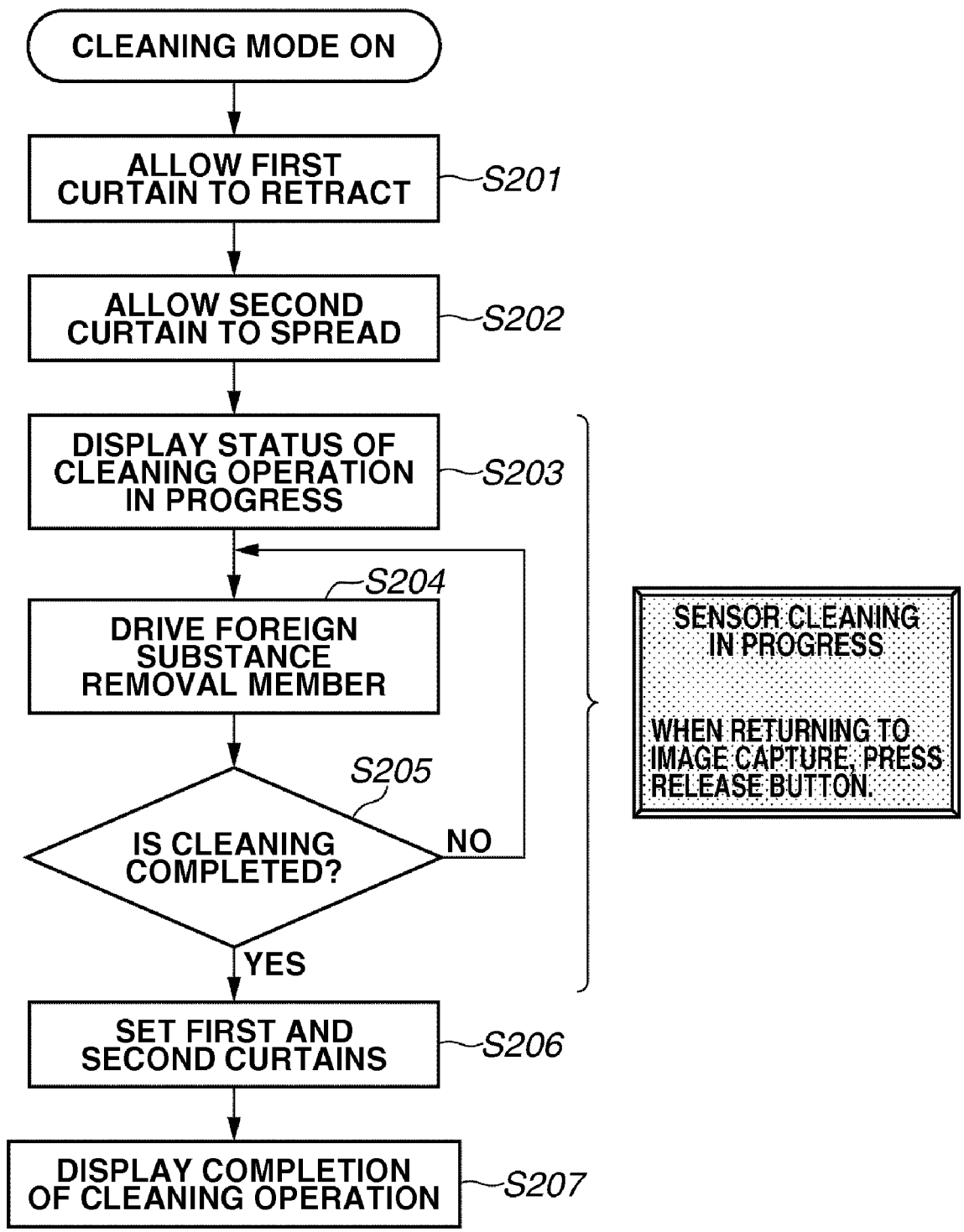
FIG. 10 is a flowchart illustrating a foreign substance removal operation sequence according to the second exemplary embodiment.

Next, referring to FIGS. 9A to 9D and 10, the foreign substance removal operation will be described. When the foreign substance removal operation is started, then in step S201, the camera retracts the first curtain 31, which is disposed on the imaging plane side, downward, and then in step S202, the camera spreads the second curtain 33, thereby shielding the photographic aperture. In step S203, the camera executes display on a display monitor in order to inform a user that the foreign substance removal operation is in progress. A display example at this time is illustrated in FIG. 10. This display is continued until the foreign substance removal operation is completed in step S205.

In step S204, the camera moves the foreign substance removal member downward from the retracted position (FIG. 9B). The foreign substance removal member is moved on the traveling face of the first curtain 31. However, since the first curtain 31 is already retracted, the foreign substance removal member does not interfere with the first curtain 31. Note that timing to start the movement of the foreign substance removal member from the retracted position is not necessarily after the first curtain 31 is completely retracted outside the photographic aperture. The timing can be at the same time when the first curtain 31 is moved or slightly delayed.

After foreign substances adhering to the flocked member 107 are brushed off by the rotational removal unit 119, the flocked member 107 is moved in contact with the surface of the LPF 104, thereby removing foreign substances adhering to the surface of the LPF 104. When the foreign substance removal member reaches the lower end of the LPF 104 (FIG. 9C), the flocked member 107 is brought into contact with the foreign substance capture unit 122. Thus, foreign substances adhering to the flocked member 107 are captured by the foreign substance capture unit 122.

Thereafter, a motor-energizing direction is reversed. Thus, the foreign substance removal member is moved upward and the flocked member 107 is brought into contact with the rotational removal unit 119 (FIG. 9D). In this direction, the rotation of the rotational removal unit 119 is permitted. Accordingly, in step S205, the flocked member 107 passes over the rotational removal unit 119 with a slight contact force while rotating the rotational removal unit 119 to return to the retracted position.

In step S206, the camera sets the first curtain 31 and the second curtain 33 in the former positions. In step S207, upon image capture being ready, the camera displays the state that the foreign substance removal operation is completed.

Note that as described also in the first exemplary embodiment, if image capture is instructed during the foreign substance removal operation, the operation sequence in FIG. 8 is executed. Thus, an image capture standby state can quickly be set.

Further, if the arrangement of the shutter blade and the foreign substance removal member has the above-described relation, it is not indispensable for the first curtain 31 to be present on the imaging plane side and for the second curtain 33 to be present on the object side. FIG. 9A illustrates a state immediately after the shutter operation is completed. Thus, it is also possible that the second curtain 33 covers the photographic aperture on the imaging plane side and the first curtain 31 is retracted upward on the object side. In this case, the shutter blade executes an exposure operation by traveling from the bottom to the top.

Third Exemplary Embodiment

Referring to FIGS. 11A to 11D and 12, a third exemplary embodiment of the present invention will be described. As described hereinafter, description will center on a point different from the first and second exemplary embodiments. Description of the same configuration and operation is not repeated. The third exemplary embodiment is different from the above-described second exemplary embodiment in the foreign substance removal operation and the shutter operation sequence.

Figure 11:
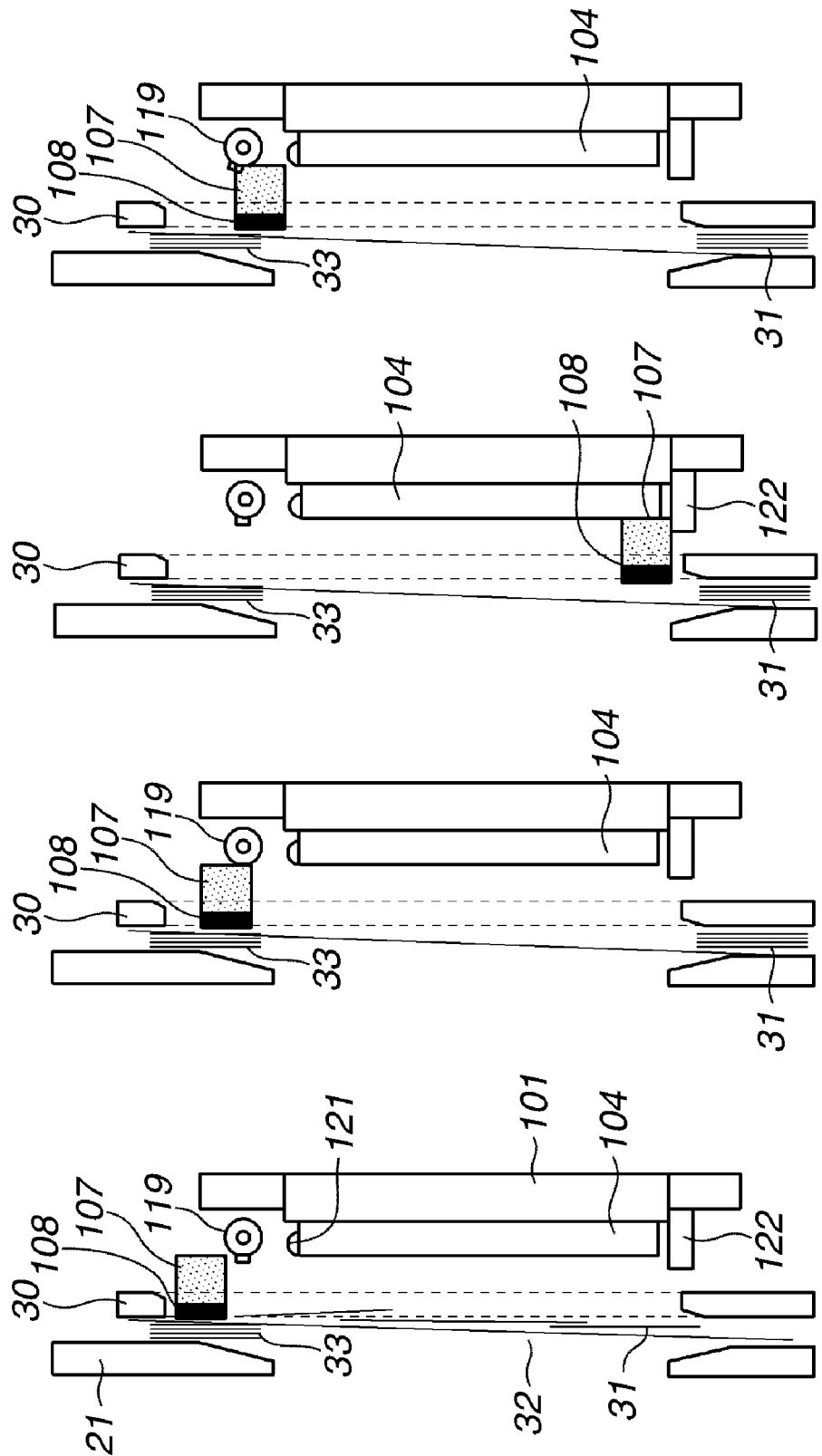
FIGS. 11A to 11D are diagrams illustrating a configuration of a foreign substance removal mechanism according to a third exemplary embodiment of the present invention.
Figure 12:
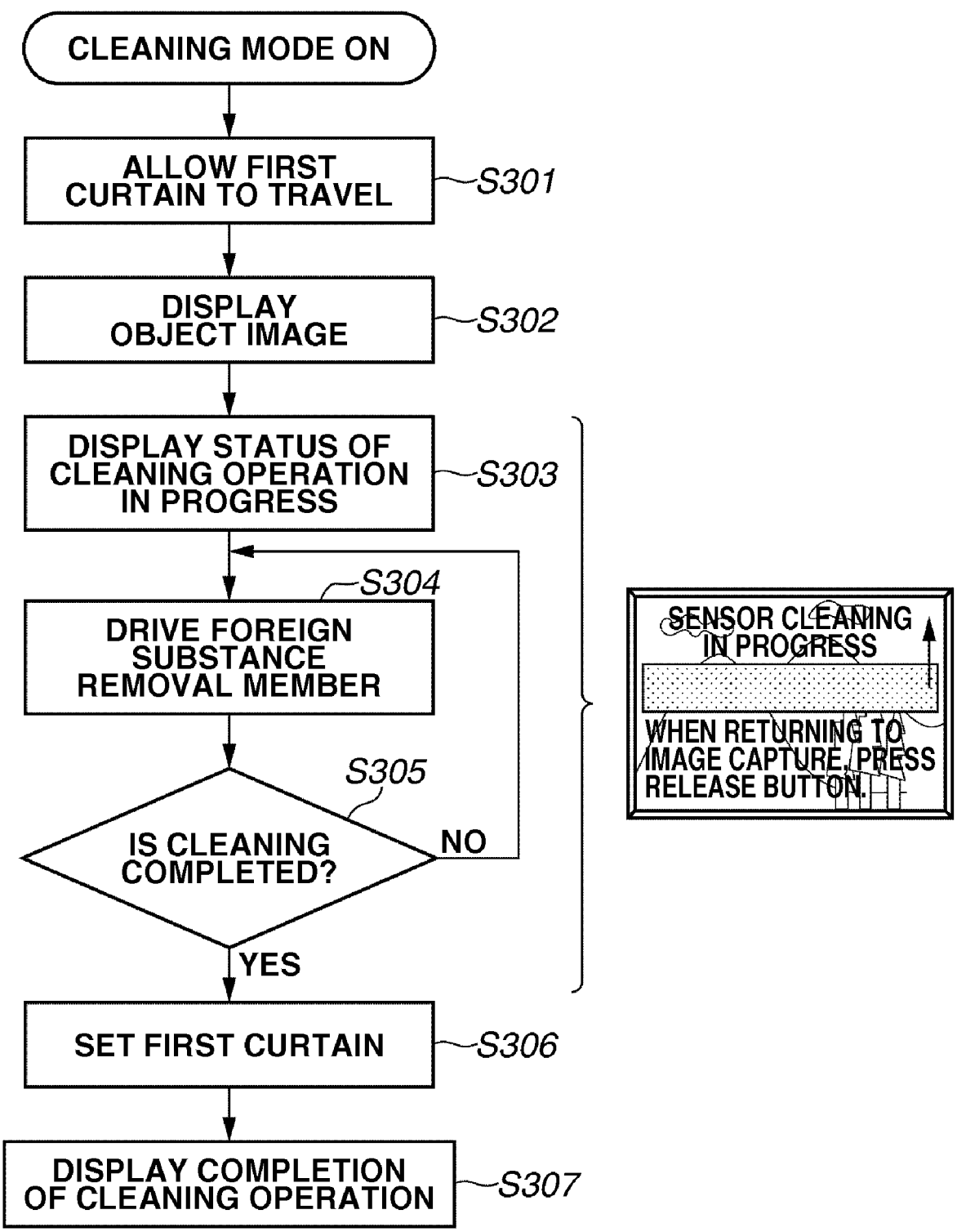
FIG. 12 is a flowchart illustrating a foreign substance removal operation sequence according to the third exemplary embodiment.

When the foreign substance removal operation is started, then in step S301, the camera retracts the first curtain 31, disposed on the imaging plane side, downward and opens the photographic aperture. The camera also retracts a reflection mirror. Thus, an object image is incident on the image sensor 101. Hence, in step S302, the camera displays an object image on a display monitor. In step S303, the camera displays the information superimposed on an object image that the foreign substance removal operation is in progress. In step S304, the camera keeps this state intact and moves the foreign substance removal member downward from the retracted position (FIG. 11B). During the foreign substance removal operation, the image of the image sensor 101 is displayed on the display monitor to observe and confirm the foreign substance removal member scanning on the surface of the LPF 104. That is, an object image, the state of the foreign substance removal member, and display of the state that the foreign substance removal operation is in progress are displayed together. This display is continued until the foreign substance removal operation is completed (step S305).

After foreign substances adhering to the flocked member 107 are brushed off by the rotational removal unit 119, the flocked member 107 is moved while the locked member 107 is in contact with the surface of the LPF 104, thereby removing foreign substances adhering to the surface of the LPF 104. When the foreign substance removal member reaches the lower end of the LPF 104 (FIG. 11C), the flocked member 107 is brought into contact with the foreign substance capture unit 122. Thus, foreign substances adhering to the flocked member 107 are captured by the foreign substance capture unit 122.

Thereafter, a motor-energizing direction is reversed. Thus, the foreign substance removal member is moved upward and the flocked member 107 is brought into contact with the rotational removal unit 119 (FIG. 11D). In this direction, the rotation of the rotational removal unit 119 is permitted. Accordingly, in step S305, the flocked member 107 passes over the rotational removal unit 119 with a slight contact force while rotating the rotational removal unit 119 to return to the retracted position.

Subsequently, in step S306, the camera sets the first curtain 31 in the former position to cover the photographic aperture. Upon the standby state of image capture, in step S307, the camera displays the state that the foreign substance removal operation is completed on the display monitor.

Note that as described also in the first exemplary embodiment, if image capture is instructed during the foreign substance removal operation, the operation sequence in FIG. 8 is executed. Thus, an image capture standby state can quickly be set.

In the type of the shutter unit described in the first exemplary embodiment, only the first curtain travels to open the photographic aperture, and in order to hold the second curtain in a retracted state, it is necessary to continue energizing a coil for the second curtain. In other shutter mechanisms, it has also been known that the second curtain can be held without energizing and a blade is directly driven by a motor. Using these shutter units also allows energizing to the shutter during the cleaning operation to be eliminated.

Further, when a shutter, which is referred to as a normally open type and retracts both the first curtain and second curtain outside a photographic aperture, is used, the state before image capture is started is illustrated in FIG. 11B. Thus, an object image will always be incident on an image sensor. In this case, the camera can display the state that foreign substance removal operation is completed, without covering a photographic aperture with the first curtain when the foreign substance removal member is retracted.

Fourth Exemplary Embodiment

Referring to FIGS. 13A to 13D, a fourth exemplary embodiment of the present invention will be described. As described hereinafter, description will center on a point different from the first to third exemplary embodiments. Description of the same configuration and operation is not repeated. The fourth exemplary embodiment is different from the above-described third exemplary embodiment in the configuration of shutter blades.

As illustrated in FIGS. 13A to 13D, only one set of shutter blades 44 is present between the shutter plate 21 and the cover plate 30, and control of the exposure amount is executed by controlling the electric charge accumulation time of the image sensor 101. The shutter blade 44 is used for shielding unnecessary incident light on the image sensor 101, or for controlling the electric charge accumulation end timing while the electric charge accumulation start timing is controlled by the image sensor 101.

When the camera is configured with such one set of shutter blades, similarly to the above-described exemplary embodiments, the opening portion 30a is formed on the cover plate 30 such that the foreign substance removal member can be retracted in the opposite side to a retracted direction of the shutter blade. As illustrated in FIG. 13A, this configuration does not cause the foreign substance removal member to interfere with the shutter blade 44 even when the shutter blade 44 is shielding the photographic aperture. When the foreign substance removal operation is started, as illustrated in FIG. 13B, first, the shutter blade 44 is retracted downward, and then as illustrated in FIGS. 13C and 13D, the foreign substance removal member is moved from the retracted position to scan the surface of the LPF 104.

Fifth Exemplary Embodiment

Referring to FIGS. 14A to 14D, a fifth exemplary embodiment of the present invention will be described. As described hereinafter, description will center on a point different from the first to fourth exemplary embodiments. Description of the same configuration and operation is not repeated. The fifth exemplary embodiment is different from the above-described second exemplary embodiment in the configuration of the foreign substance removal member.

An electric charge member 201 is attached to the support plate 108. Further, above the LPF 104, an electric charge unit 202 and an electric charge removal unit 203 are disposed. FIG. 14A illustrates a state before the foreign substance removal operation. A part of the support plate 108 is protruded over the face of the cover plate 30 on the first curtain 31 side.

When the foreign substance removal operation is started, the first curtain 31 is retracted downward and the second curtain 33 is spread, thereby shielding the photographic aperture. Next, the foreign substance removal member is moved downward from the retracted position. When the foreign substance removal member passes over the electric charge unit 202, electric charge is stored in the electric charge member 201 (FIG. 14B). Then, the electric charge member 201 is moved near the surface of the LPF 104 without contact, thereby attracting and removing foreign substances adhering to the surface of the LPF 104 by electrostatic force.

After the foreign substance removal member reached the lower end of the LPF 104 (FIG. 14C), a motor-energizing direction is reversed, thereby moving the foreign substance removal member upward. When the foreign substance removal member passes over the electric charge removal unit 203, an electric charge is removed from the electric charge member 201, so that foreign substances adhering to the electric charge member 201 drop (FIG. 14D). Note that an adhesive unit configured to capture a falling foreign substance is disposed around the electric charge removal unit 203. Subsequently, the photographic aperture is covered with the first curtain 31, and the camera is set in the image capture standby state.

Sixth Exemplary Embodiment

Referring to FIGS. 15A to 15D, 16A, and 16B, a sixth exemplary embodiment of the present invention will be described. As described hereinafter, description will center on a point different from the first to fourth exemplary embodiments. Description of the same configuration and operation is not repeated. The sixth exemplary embodiment is different from the above-described second exemplary embodiment in the configuration of the foreign substance removal member.

A wiper 301 is attached to the support plate 108 via a leaf spring member 302. Further, a removal unit 303 is disposed above the LPF 104 and an adhesion unit 304 is disposed below the LPF 104. FIG. 15A illustrates a state before the foreign substance removal operation. A part of the support plate 108 is protruded to pass over the face of the cover plate 30 on the first curtain 31 side.

When the foreign substance removal operation is started, the first curtain 31 is retracted downward and the second curtain 33 is spread, thereby shielding the photographic aperture. Next, the foreign substance removal member is moved downward from the retracted position. When the foreign substance removal member passes on the removal unit 303, foreign substances attached to the wiper 301 are removed. Then, while the wiper 301 is moved on the surface of the LPF 104, the wiper 301 is deformed in contact with the surface of the LPF 104 (FIG. 15B). The leaf spring member 302 is interposed between the support plate 108 and the wiper 301. Thus, even if the wiper 301 is deformed, the contact state with the surface of the LPF 104 is not changed. Since the wiper 301 is made of rubber, the wiper 301 has rigidity higher than that of a flocked sheet and is hardly deformed. Accordingly, in order to make pressure on the LPF 104 constant, a leaf spring member having elasticity lower than that of the wiper 301 is disposed between the support plate 108 and the wiper 301. Even if an interval between the support plate 108 and the LPF 104 is slightly changed, the leaf spring member 302 absorbs it. Thus, the wiper 301 can be in contact with the surface of the LPF 104 at a certain pressure.

When the foreign substance removal member reaches the lower end of the LPF 104 (FIG. 15C), the wiper 301 is brought into contact with the adhesion unit 304 and foreign substances adhering to the wiper 301 are captured by the adhesion unit 304. Thereafter, motor energizing is reversed, thereby moving the foreign substance removal member upward. When the foreign substance removal member passes on the removal unit 303, foreign substances adhering to the wiper 301 are removed (FIG. 15D). Subsequently, the photographic aperture is covered with the first curtain 31 and the camera is set in the image capture standby state.

Figure 16A:
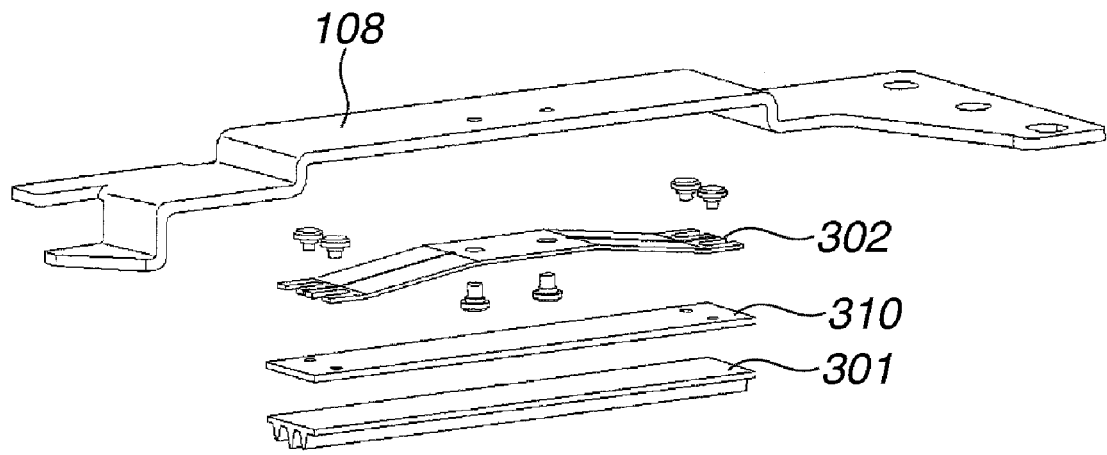
FIGS. 16A and 16B are perspective views illustrating a configuration example of a foreign substance removal member according to a sixth exemplary embodiment of the present invention.
Figure 16B:
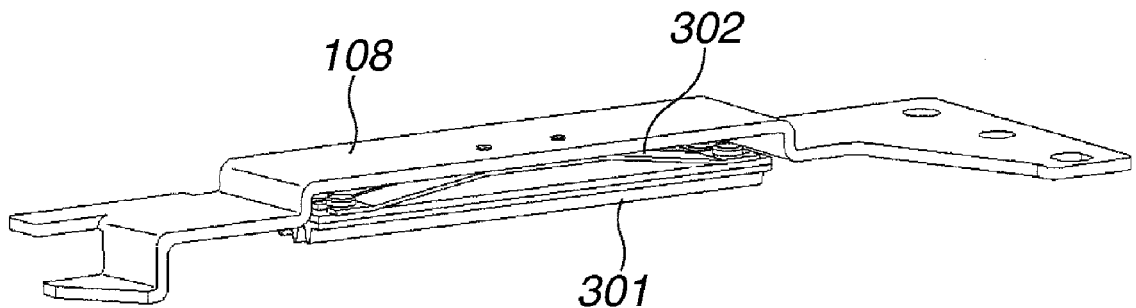

FIGS. 16A and 16B are perspective views illustrating a configuration example of the foreign substance removal member in the present exemplary embodiment. FIG. 16A illustrates a state that the foreign substance removal member is exploded. FIG. 16B illustrates a state that the foreign substance removal member is assembled. The leaf spring member 302 having a plurality of bending portions is secured to the bending portion of the support plate 108. The rubber wiper 301 is bonded to a metal plate 310. Both ends of the leaf spring member 302 are fixed to the metal plate 310 with screws such that the leaf spring member 302 can be deformed so as to expand and contract.

Note that FIG. 16 illustrates the wiper 301 having a wave-shaped cross section surface, but the shape of the wiper 301 is not limited to that as illustrated.

Thus, a configuration in which an elastic member is interposed between the support plate 108 and the wiper 301 allows remaining wiping to be eliminated, pressure to be kept constant, and abrasion due to temperature, humidity and the number of operation times, and pressure fluctuation due to deformation to be alleviated. Note that when the flocked member 107 described in the above-described exemplary embodiments is used, an elastic member may be interposed between the support plate 108 and the flocked member 107. The configuration in the present exemplary embodiment enables securing a space for interposing the elastic member between the support plate 108 and the wiper 301, so that a foreign substance removal capability is improved.

Note that the foreign substance removal member is not limited to the above-described exemplary embodiments. If the foreign substance removal member is moved along the surface of an optical member to remove foreign substances, it does not matter whether or not the foreign substance removal member is in contact with the surface of the optical member. Since in the configuration, a sufficient interval can be secured between the support plate 108 and the surface of the LPF 104, a removal member for removing foreign substances adhering to the surface of an optical member can be used other than the flocked member 107 illustrated in the first to fourth exemplary embodiments, the electric charge member 201 which uses electric attraction force illustrated in the fifth exemplary embodiment, and the wiper 301 illustrated in the sixth exemplary embodiment. For example, the foreign substance removal member can be sponges, nonwoven fabrics, rubbers or the like, and also adhesive rollers, rotary brushes, or the like. Further, the foreign substance removal member can be an air blowing device having an air blowing port. Further, the foreign substance removal member can be configured with a combination of a plurality of these examples.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-337730 filed Dec. 27, 2007, which is hereby incorporated by reference herein in its entirety.

What is claimed is:

1. An imaging apparatus comprising:
a foreign substance removal member configured to move along a surface of an optical member to remove foreign substances; and
a shutter blade configured to open and close a photographic optical path, the shutter blade being disposed closer to an object side than the optical member,
wherein the foreign substance removal member moves independently from the shutter blade,
wherein a moving locus of the foreign substance removal member and a moving locus of the shutter blade overlap each other in an optical axis direction, and
wherein the foreign substance removal member moves along the surface of the optical member while the shutter blade opens the photographic optical path.

2. The imaging apparatus according to claim 1, wherein the shutter blade has a first shutter blade which travels across the photographic optical path from a closed state to an open state during image capturing and a second shutter blade which travels across the photographic optical path from an open state to a closed state during image capturing,
wherein a moving locus of the foreign substance removal member and a moving locus of the first shutter blade overlap each other in an optical axis direction,
wherein the moving locus of the foreign substance removal member and a moving locus of the second shutter blade do not overlap in the optical axis direction, and
wherein the foreign substance removal member moves along the surface of the optical member while the first shutter blade opens the photographic optical path and the second shutter blade closes the photographic optical path.

3. The imaging apparatus according to claim 1, wherein the shutter blade has a first shutter blade which travels across the photographic optical path from a closed state to an open state during image capturing and a second shutter blade which travels across the photographic optical path from an open state to a closed state during image capturing,
wherein a moving locus of the foreign substance removal member and a moving locus of the first shutter blade overlap each other in an optical axis direction,
wherein the moving locus of the foreign substance removal member and a moving locus of the second shutter blade do not overlap in the optical axis direction, and
wherein the foreign substance removal member moves along the surface of the optical member while the first shutter blade and the second shutter blade open the photographic optical path.

* * * * *